INVENTOR.
RAGNAR W. WINBERG
BY
Arnstein & Levy
ATTORNEYS

Sept. 13, 1966  R. W. WINBERG  3,271,830
BUCKLE FORMING STOCK
Original Filed March 10, 1960  4 Sheets-Sheet 2

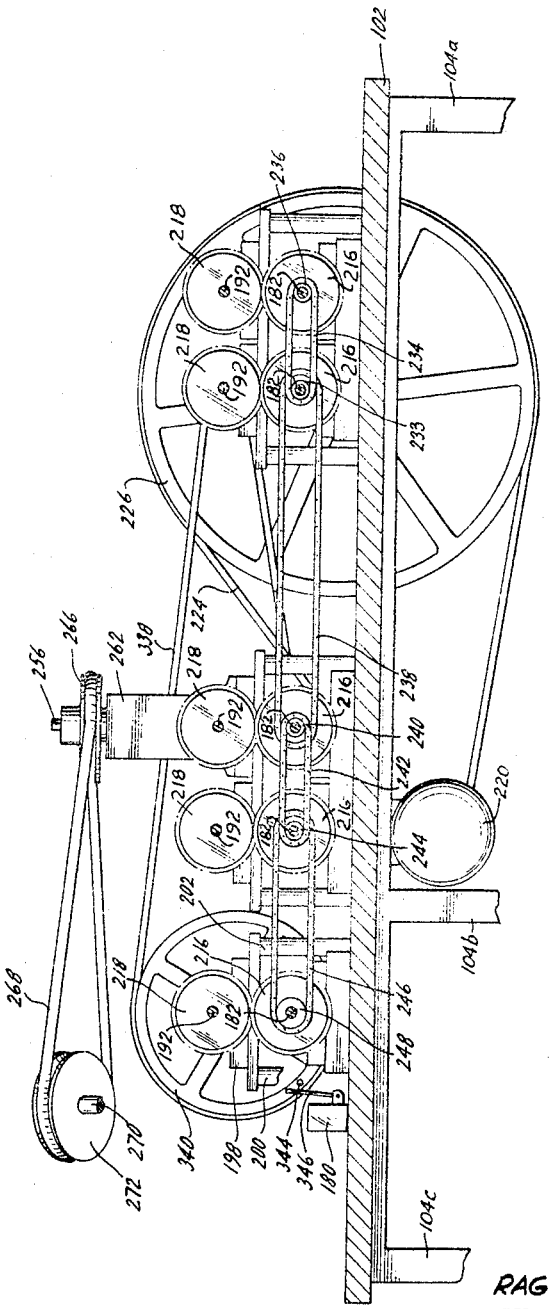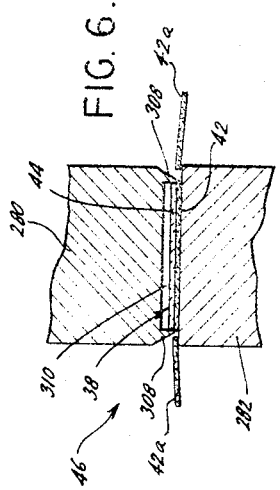

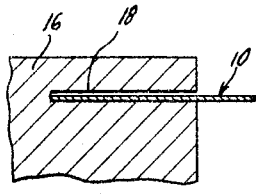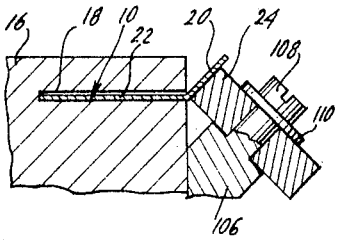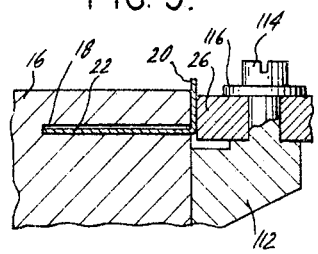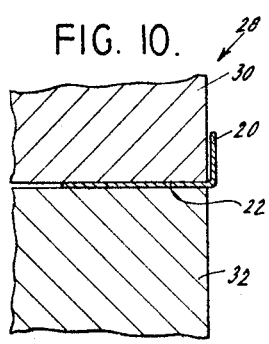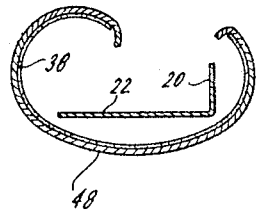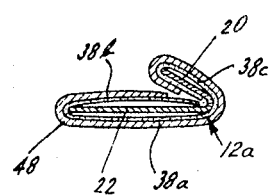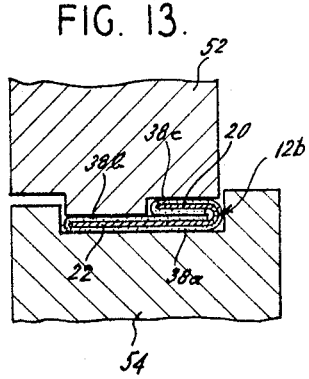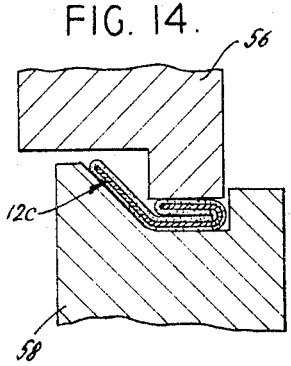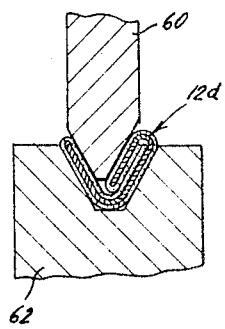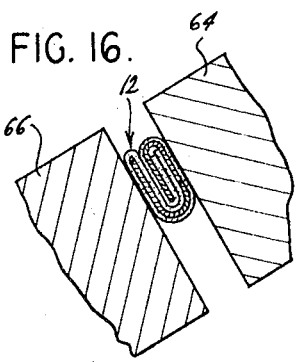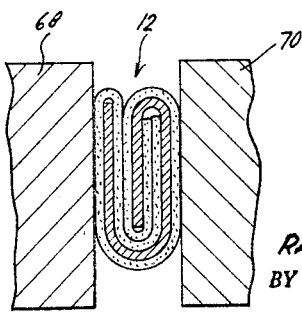

United States Patent Office 3,271,830
Patented Sept. 13, 1966

3,271,830
BUCKLE FORMING STOCK
Ragnar W. Winberg, 115 W. Elder Ave.,
Floral Park, N.Y.
Original application Mar. 10, 1960, Ser. No. 14,047, now Patent No. 3,111,156, dated Nov. 19, 1963. Divided and this application Sept. 19, 1963, Ser. No. 310,090
4 Claims. (Cl. 24—163)

The present invention relates generally to buckle manufacturing and specifically to a buckle-forming stock of the type having a metallic core sheathed with a material facing and to an improved buckle body. This is a division of U.S. patent application Serial No. 14,047, filed March 10, 1960, entitled, Buckle Stock Forming Machine and Method, now Patent No. 3,111,156.

In the manufacture of belt buckles, it is often desirable to sheath a buckle, frame or body with a material covering such that it matches with, or contrasts with, the garment on which it is worn. A number of different techniques have been employed to manufacture covered buckle-forming stock, the most frequently used method involving sewing a material facing strip around a wire core. This results in a buckle-forming stock including a wire core surrounded by a material covering having a sewn welting extending the length of the wire core. The buckle-forming stock is then formed into buckle frames by the use of forming machines, such as disclosed in my Patent No. 2,739,367, entitled, Buckle Forming Machine, of March 27, 1956. Although such wire-core buckle frames are widely used and are acceptable generally to the trade, the present invention contemplates an improved buckle stock which may be manufactured on a substantially automatic basis and may be formed into a buckle body by essentially conventional techniques.

A persistent problem which arises in the manufacture of covered, or sheathed, belt buckles, is that the sheathing material often is not available in a long continuous strip. This situation is normally encountered in the manufacture of "self" belts where both the belt and buckle are sheathed with the material used in the garment on which the belt is to be worn. It will be appreciated that the most economical source of material for use on the belts and buckles is from the material remnants which remain after the garment itself has been cut. It will be further appreciated that these remnants are usually of relatively short lengths. It is therefore advantageous to provide, in a machine for the manufacture of sheathed buckle-forming stock, a means to use short lengths of facing material in a substantially automatic operation. It is further advantageous to provide a means for fabricating covered buckle stock in one manufacturing operation. It has generally been the practice to cover a wire core with pieces of fabric and then, in a separate operation, stitch a welding in the fabric along the length of the wire core, thus producing a stock to be utilized to form a covered buckle.

Broadly, it is the object of the present invention to provide an improved buckle-forming stock. Specifically, it is the object of my invention to provide a buckle-forming stock comprising a flat metallic core strip which is sheathed, without stitching, with a material facing.

It is a further object of my invention to provide an improved buckle stock which may be formed into buckles in conventional and available machinery, which is relatively inexpensive to manufacture and which results in a product having improved characteristics.

In accordance with an illustrative embodiment of the present invention, there is provided an improved buckle stock comprising an elongated core strip which includes a main core section and a clinching section extending along one side thereof. An elongated material facing strip is provided which is wider than the core strip and which includes a main facing section confronting one face of the core strip, and auxiliary facing sections on either side of the main facing section. One of the auxiliary facing sections is wrapped about the clinching section and extends over to the opposite face thereof. The clinching section of the core strip is folded back against the main core section with the edges of the material facing strip contained therebetween to clinch the facing strip to the core strip. The assembly of the core strip and the facing strip is longitudinally folded in half, with the clinching section contained within the folded halves of the main core section, the main facing section of the facing strip forming the opposite outside surfaces of the buckle stock.

The above brief description, as well as further objects, features and advantages of the present invention will be best appreciated by reference to the following detailed description of a presently preferred embodiment, when taken in conjunction with the accompanying drawings wherein:

FIG. 4 is a sectional view taken substantially along the line 4—4 of FIG. 3 and looking in the direction of the arrows, with portions of the machine omitted for the sake of clarity, and illustrating further portions of the driving mechanisms for the elements of the machine;

Figure 1:
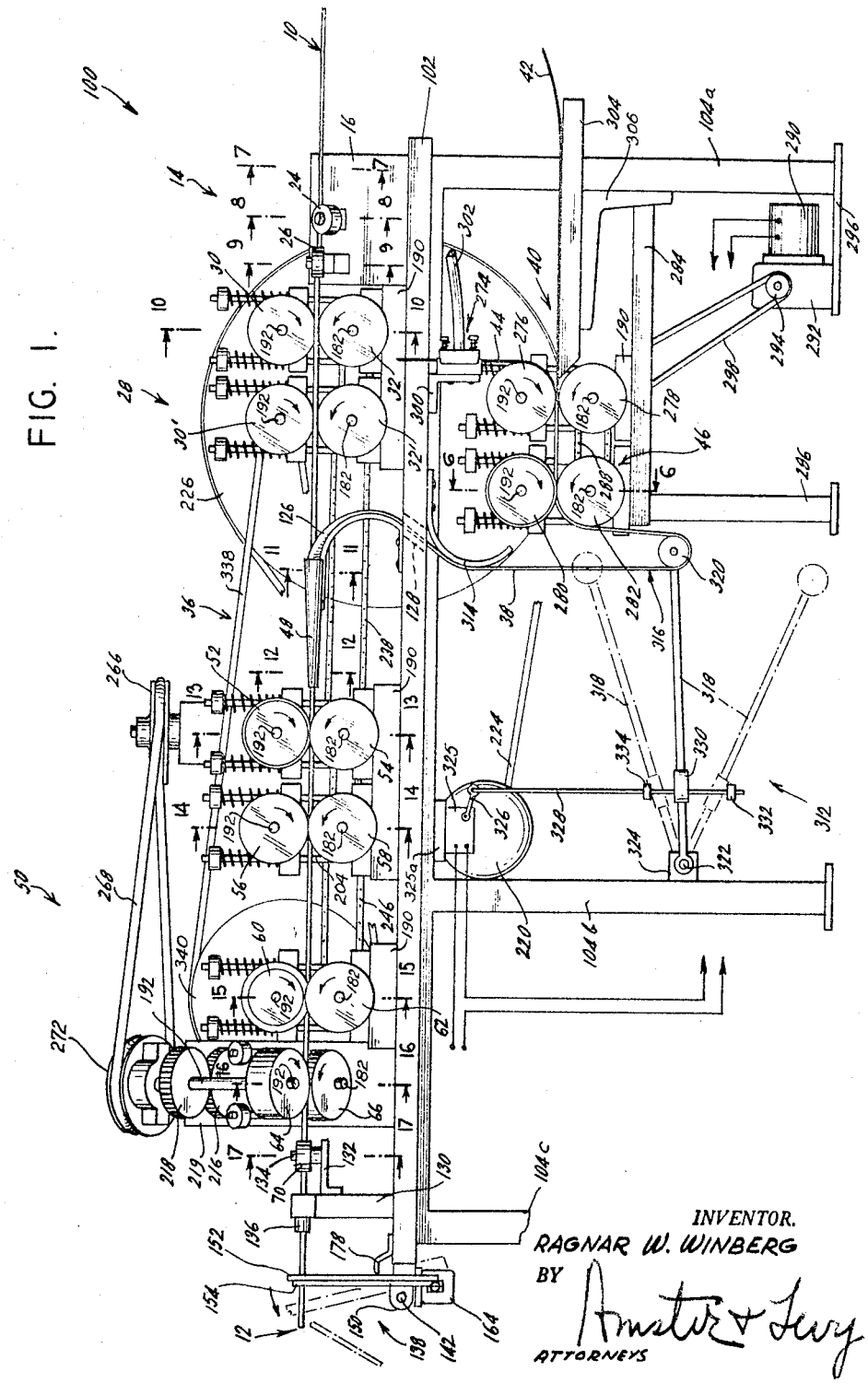
FIG. 1 is a front elevational view of a buckle stock forming machine according to the present invention, illustrating the flow of materials into the machine and completed buckle stock out of the machine.

FIG. 5 is a perspective view of a buckle frame employing buckle stock as produced by the illustrated machine; and, FIGS. 6 through 17 are sectional views taken along the lines 6—6 through 17—17 respectively of FIG. 1 and looking in the direction of the arrows. These figures depict the various operational processes of the machine as the material flows therethrough, specifically:

FIG. 6 shows trimming rollers, trimming the edges of the facing material;

FIG. 7 shows the metal core strip entering the machine;

FIG. 8 shows the first bending means at the preforming station;

FIG. 9 shows the second bending means at the preforming station;

FIG. 10 shows the first drive wheels;

FIGS. 11 and 12 depict operations at the assembly station, specifically:

FIG. 11 illustrates the entrance to the folder with a core section and facing strip entering therein; and, FIG. 12 illustrates a further section of the folder wherein the facing strip has been assembled with the core section;

FIGS. 13 through 17 are sectional views at various locations along the roller means wherein the facing strip is secured to the core. Specifically:

FIG. 13 illustrates the first clinching rollers wherein the clinching section is secured against the main core section;

FIG. 14 shows the second roller means wherein the main core section is folded around the clinching section;

FIG. 15 illustrates the third roller means wherein the main core section is further folded around the clinching section;

FIG. 16 shows the fourth roller means wherein the main core section is folded completely around the clinching section; and FIG. 17 illustrates the alignment rollers wherein the buckle stock is oriented into vertical position.

Prior to a detailed description of a presently preferred but illustrative apparatus of my invention, a detailed reference will be made to FIGS. 7 through 17 in the drawings for a general description of a manufacturing process according to the invention. It should be noted that in the sequence of operations as depicted in FIGS. 7 through 17, the materials flow in a direction out from the drawings towards the viewer. In FIG. 7 a metal core strip 10, which is to be the structural base of the finished buckle stock 12 (shown in FIG. 17), is shown entering the first or pre-forming station 14 through the entrance slit 18 in a preforming block 16. The metal core strip 10 has a clinching section 20 and a main core section 22 with the clinching section 20 being less than one-third the total width of the metal core strip 10. Entrance slit 18 is equal in depth to the width of the main core section 22 so that the clinching section 20 projects therefrom. As the metal core strip progresses from the position shown in FIG. 7 to the position shown in FIG. 8, the clinching section 20 contacts a first bending roller 24 which is positioned to bend that portion of the metal core strip 10 which projects from out of the entrance slit 18 back at an angle with respect to the main core section 22. The clinching section 20 is further bent in an upward direction by the second bending roller 26 positioned to bend the clinching section 20 to a right angle position with respect to the main core section 22, as shown in FIG. 9.

The metal core strip 10 is drawn through the preforming station 14 illustrated in FIGS. 7 through 9 by the drive roller assembly 28. In FIG. 10, the first pair of drive rollers 30, 32 are shown with the main core section 22 of the metal core strip 10 gripped therebetween. The drive roller assembly 28, driven as will be described below, is effective to draw the metal core strip 10 through the preforming station 14 and deliver it to the next station, the assembly station 36 shown in section in FIGS. 11 and 12.

A facing strip 38 is introduced at the assembly station 36 along with the inflowing metal core strip 10. The facing strip is fabricated substantially concurrent with the preforming operations described above at a laminating and trimming station 40. The facing strip 38 is constructed of a facing material 42 and a continuous lining strip 44, the fabrication of which will be described in detail below. After the facing strip 38 has been formed it is passed through a trimming device, best seen in FIG. 6 and to be more fully described below, wherein its edges are trimmed so that the resulting product is an evenly edged strip appearing to be of a single layer of material. For the sake of clarity the facing strip 38 has been illustrated in all drawings except FIG. 6 as being a single layered fabric strip, it being understood that the facing strip 38 is composed of a material facing 42 and a continuous lining strip 44 which have been adhesively laminated together.

In the assembly station 36 a folder 48, which receives both the pre-formed metal core strip 10 and the facing strip 38, wraps the facing strip 38 around the core strip 10 and bends the clinching section 20 against the main core section 22, thus securing the facing strip 38 to the core strip 10. FIGS. 11 and 12 are sectional views at the beginning and the end of the operations in the assembly station 36 showing the folder 48 at its widest and narrowest points. As best seen in FIG. 12, the assembled core strip 10 and facing strip 38 pass out of the narrow end of the folder 48, with the clinching section 20 further bent towards the main core section 22, thereby holding the facing strip 38 about the core strip 10. The facing strip 38 is of a width greater than the total width of the core strip 10 plus the width of the main core section 22. It is thus possible to wrap the facing strip 38 around the core strip 10 and clinch the clinching section 20 against the main core section 22 with both edges of the facing strip contained therebetween. The facing strip 38 has a main facing section 38a medially of said facing strip 38 which is adapted to confront the face of the main core section 22 directed away from the clinching section 20. Two auxiliary facing sections 38b and 38c, located on either side of the main facing section 38a, are adapted to be wrapped around the remaining surfaces of the core strip 10, their respective edges being positioned between the main core section 22 and the folded clinching section 20.

After emerging from the assembly station 36 the assembled core strip 10, comprising the partially completed buckle 12a, with portions of the machine omitted for the sake of clarity and illustrating further portions of the driving mechanisms for the elements of the machine, passes through a series of driven shaping rollers generally designated by the numeral 50. The sequence of operation in the shaping rollers 50 is illustrated in FIGS. 13 through 16 and their locations are illustrated in FIG. 1. The assembled core strip 10 and facing strip 38 or the partially completed buckle stock 12a first passes through clinching rollers 52, 54 wherein the clinching section 20 is bent flat against the main core section 22 for permanently securing the facing strip 38 thereto, thus producing assembly 12b; first main core section folding rollers 56, 58 are effective to start folding the main core section 22 about the clinching section 20 to produce the assembly 12c as shown in FIG. 14; second main core section folding rollers 60, 62 are effective to further bend the main core section 22 to form assembly 12d; and finally clinching rollers, 64, 66 complete the folding of the main core section 22 about the clinching section 20 to produce a buckle forming stock 12 as seen in FIGS. 16 and 17. In FIG. 17 further roller means are illustrated comprising a pair of horizontally opposed alignment rollers 68, 70 which are effective to orient the buckle forming stock 12 prior to the cut-off operation to be described in detail below.

Figure 2:
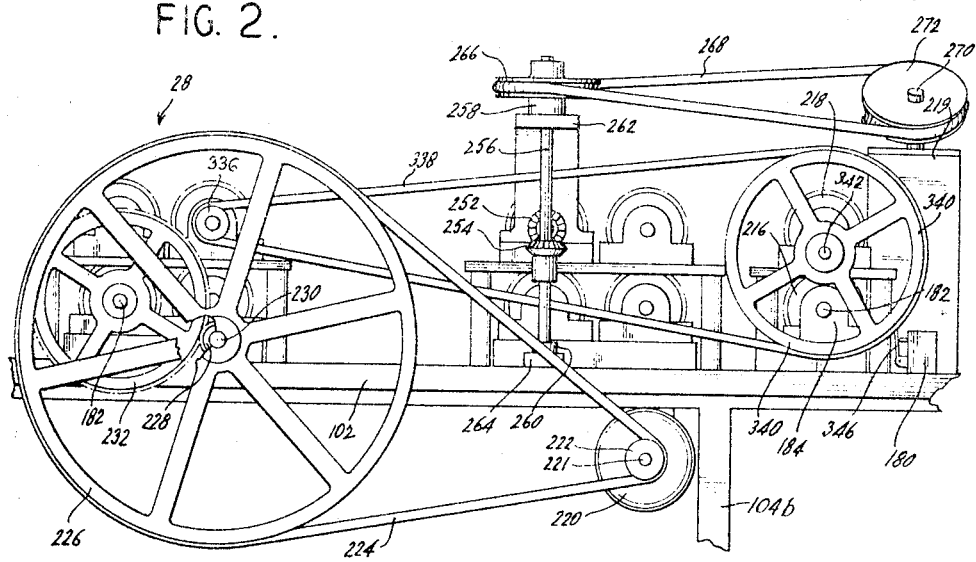
FIG. 2 is a partial rear elevational view showing a portion of the drive mechanism for the machine.

Reference will now be made to FIGS. 1, 2 and 4 for a description of the overall configuration and operation of the buckle forming machine, generally designated by the numeral 100. The machine 100 is supported on a flat bed or base 102 which stands on three pairs of legs 104a, 104b and 104c. The sequence of operations as described above and as illustrated in FIGS. 7 through 17 occurs as the core strip 10 flows from right to left as viewed in FIG. 1. At the right hand end of the base 102, as viewed in FIG. 1, there is located the preforming block 16 at the preforming station 14. As described above in connection with FIGS. 8 and 9 the metal core strip 10 is preformed at preforming station 14 by the action of a first and second bending rollers 24 and 26. The first bending roller 24 is mounted on the preforming block 16 by means of a first mounting block 106 secured to the preforming block 16, a pivot screw 108 and washer 110. The pivot screw 108 is oriented at a 45° angle to the plane of the main core section 22 so that the first bending roller 24 is effective to bend the clinching section 20 to a 45° relationship with the main core section 22. The second bending roller 26 is similarly mounted on the preforming block 16 by means of a second mounting block 112, a pivot screw 114 and a washer 116. In this case the axis of rotation of the second bending roller 26 is at right angles to the main core section 22, such that the clinching section 20 is bent at right angles to the main core section 22 as seen in FIG. 9.

The core strip 10 is drawn through the preforming station 14 by the action of the drive roller assembly 28 located immediately to the left of the preforming station 14 as viewed in FIG. 1. Two pairs of vertically oriented co-acting drive rollers 30, 32 and 30¹ and 32¹ are mounted in a side by side relationship and are effective to grip the core strip 10 between the cooperating rollers of each pair.

Although a detailed description of the drive mechanism for the buckle stock forming machine 100 is to be given below, including the drive and mounting means for the drive roller assembly 28, it should be noted that the lower two rollers 32, 32¹ are driven at an equal and uniform speed in a counterclockwise direction as viewed in FIG. 1 and that the upper rollers 30, 30¹ are driven in a clockwise direction by suitable gearing means connected to the rotation of rollers 32, 32¹ respectively. It should be further noted that the upper rollers 30, 30¹ are not rigidly mounted on the machine 100 but are movable in a vertical direction and are biased against rollers 32, 32¹ respectively by spring loaded mounts to be described more fully in connection with the overall drive mechanism. Thus, wheels, 30, 32 and 30¹, 32¹ coact to grasp the core strip 10 through the preforming station 14.

The core strip 10, now comprised of a main core section 22 and a clinching section 20 at right angles thereto, passes on to the assembly station 36 and into the open end of the folder 48 as best viewed in the sectional view of FIG. 11. Folder 48 is mounted along the path of travel of the core strip 10 by means of the mounting bracket and facing strip guide 126 which is also effective to guide the flow of the facing strip 38 through a facing strip passage 128 in the base 102 from the laminating and trimming station 40. The mounting bracket 126 is suitably shaped to guide the facing strip 38 into the folder 48 for assembly with the core strip 10 as shown in FIGS. 11 and 12 as described above.

After leaving the assembly station 36 the combined core strip 10 and facing strip 38, now the partially completed buckle forming stock 12a, pass into the first pair of driven shaping rollers 52, 54 of the four such pairs of shaping rollers in the roller shaping means 50 to be successively formed into assemblies 12b, 12c, 12d and finally buckle stock 12. Each of the four pairs, namely, rollers 52 and 54, 56 and 58, 60 and 62, and 66 and 64 are similarly mounted. The lowermost roller of each of these pairs is rigidly mounted and is driven in a counterclockwise direction as viewed in FIG. 1, the uppermost roller of each pair being driven in a clockwise direction and being biased towards its mating roller to co-act therewith in a manner similar to the mounting of the drive rollers 30, 32 and 30¹, 32¹. The mounting means for the shaping rollers of the roller means 50 are similar to the mounting means for the drive rollers of drive roller assembly 28 and will be fully described in connection with the description of the main drive assembly. After passing successively through rollers 52, and 54, 56 and 58, 60 and 62, and 64 and 66, the buckle forming stock 12 appears as is shown in FIG. 16 and as was described above.

Immediately to the left of the shaping roller means 50 there is mounted on the bed 102 an upstanding bracket 130 having a horizontally extending support arm 132 which supports the horizontally opposed alignment rollers 68, 70 on pivotal mounts 134. The alignment rollers 68, 70 are effective to orient the buckle stock 12 in a vertical direction for ease of handling in the subsequent operation. Mounted on the upstanding support 130 is a guide collar 136 through which passes the buckle forming stock 12 on its way to the cut-off means 138 located on the leftmost end of the base 102.

After the completion of the manufacture of the buckle forming stock 12 as described above in the machine 100, it has been found desirable to cut the stock 12 into the proper length for the formation of a finished buckle frame 140 as shown in FIG. 5. Since there are three layers of the core strip 10 and six layers of the facing strip 38 in the buckle stock 12, it is relatively difficult to bend and therefore desirable to handle in short lengths. The cutoff means 138 is effective to accomplish this operation. Since the buckle stock 12 is moving through the machine at a relatively rapid rate, it is required that the cut-off device 138 be mounted for movement with the buckle stock 12 as the cut-off operation is performed.

For this purpose the cut-off means 138 is pivotally mounted on a horizontal bar 142 rigidly connected to the base 102 by the mounting block 144. The main section 146 of the cut-off means 138 is pivotally mounted on the horizontal bar 142 by bearings 148, 150 which are rigidly connected to the main section 146 and rotate therewith on the stationary bar 142. As an integral vertical extension of the main section 146 there is a shearing blade 152 which co-acts with a related shearing blade 154 pivotally mounted on the shearing extension 152 by the nut and bolt assembly 156. The shearing extension 152 and the shearing blade 154 each have, at their uppermost extremity a shaped knifed edge 158, 160 respectively, which are located in line with the path of travel of the buckle stock 12 as it passes through the guide 136. Upon rotation of the shearing blade 154 with relation to the shearing extension 152 about the pivotal mount 156 the cut-off device 138 is effective to cut the buckle stock 12. Because of its mount on the horizontal bar 142, the complete cut-off device 138 can pivot and the shaped knifed edges 158, 160 can make an arcuate traverse as indicated by the curved arrow in FIG. 1, thus traveling with the buckle stock 12 as the knifed edges 158, 160 are in their cutting operation. A coil spring 162 is secured at one end to the horizontal bar 142 and at its other end is biased against the upstanding shearing extension 152 of the cut-off device 138 and is thus effective to bias the complete cut-off device 138 in a clockwise direction as viewed in FIG. 1. The spring 162 is therefore effective to return the cut-off device 138 to a vertical orientation upon the completion of a cutting operation. Operative means for the cut-off device 138 include a solenoid 164 which has a plunger 166 pivotally connected to the shearing blade 154 at pivot 168 by link 170 which is pivotally connected to the plunger 166 at pivot 172. A spring 174 is positioned between the link 170 and a downwardly extending extension 176 on the forward end of the main section 146. The spring 174 is effective to bias the link 170 in a direction which normally keeps the cut-off device 138 in an inoperative position. Upon energization of the solenoid 164 the plunger is effective to draw the link 170 to the rear and thus to rotate the shearing blade 154 about the pivot 156 which brings the shaped knifed edges 158, 160 into operative relationship, thus cutting off a length of buckle stock 12. The cut-off device 138 rotates in a counterclockwise direction (as viewed in FIG. 1) about the horizontal bar 142 during the operation of the cut-off device 138 and when the shearing extension 152 and shearing blade 154 are opened the cut-off device 138 returns to its normally vertical orientation by the action of spring 162. A locating stop 178 is secured to the base 102 for positioning the cut-off device 138 in a vertical orientation at the completion of a cut-off operation. The solenoid 164 is energized by the normally open micro switch 180 which is closed at periodical intervals during the operation of the machine 100 as will be subsequently described.

Figure 3:
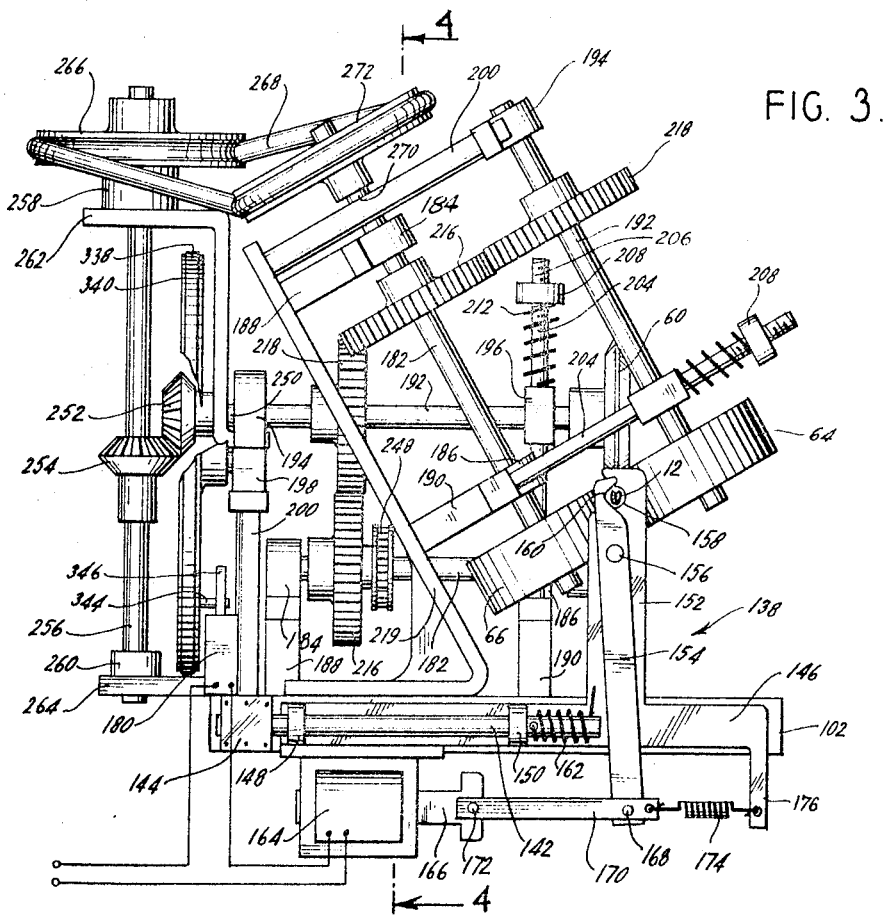
FIG. 3 is a left end elevational view of the machine shown in FIG. 1, further illustrating the drive mechanisms and showing the buckle stock cut-off device.

Reference will now be made to FIGS. 1 and 3 for a description of the mounting means for shaping rollers 60 and 62, said means being similar in all respects to the mounting means for rollers 30 and 32, 30¹ and 32¹, 52 and 54, and 56 and 58. The mounting mechanisms for rollers 64 and 66 are similar to the above with the exception of the rotation from the vertical of the full mounting mechanism as will be described below. The lower roller 62 is rigidly secured to the horizontally oriented shaft 182 which is mounted for rotation in bearing 184 at the rear, and bearing 186 at the front, of the shaft 182. The roller 62 extends forwardly of the forward bearing 186. The bearings 184, 186 are mounted on upstanding bearing supports 188, 190 respectively. The upper shaping roller 60 is rigidly secured to the rotating shaft 192 mounted for rotation in bearing 194 to the rear and 196 to the front, and is oriented parallel to and above the roller 62. The rear bearing 194 is mounted on the bearing support 198 which is positioned above the base 102 by the upstanding supports 200, 202 which are rigidly secured to the base 102. The forward bearing 196 is slidably mounted on a pair of vertically oriented bearing slide rods 204, so that the bearing 196 may move vertically with respect to the bearing 186 on the forward end of the lower shaft 182. The lower ends of the slide rods 204 are secured to lower bearing support 190 and the upper ends 206 thereof are suitably threaded to receive an adjustment nut 208 and the bearing 196, and positioned coaxially around the bearing slide rods 204 are coil springs 212 which are effective to bias the bearing 196 towards the bearing 186 and therefore to bias the upper roller 60 toward the lower roller 62. Adjustment of the magnitude of this bias force may be made by turning the adjustment nut 208, thus changing the distance between the bearing 196 and the adjustment nut 208 and thus varying the force transmitted by the spring 212 through the described mechanism to the roller 60. It should be noted that the amount of travel of the roller 60 in a vertical direction is relatively slight, it being merely the thickness of the buckle stock as shown in FIG. 15, and therefore the vertical travel of the bearing 96 is relatively small. The shaft 192 passing through bearing 196 thus makes a very small rotation about its rear bearing 194 which is constructed to allow for this slight movement. Mounted intermediate the bearings 184 and 186 on the lower shaft 182 is a drive sprocket 248 adapted to receive a link-chain drive to be described below. Intermediate the drive sprocket 248 and the bearing 184 there is rigidly attached to the lower shaft 182 a spur gear 216 which mates with a spur gear 218 of equal diameter rigidly mounted on the upper shaft 192. Thus when the lower shaft 182 is rotated in a counterclockwise direction as viewed in FIG. 1, the upper shaft 192 rotates in a clockwise direction, the drive being transferred through gears 216 and 218 respectively.

The mounting mechanism described in connection with rollers 60 and 62 are found in substantially identical form in the rollers 30 and 32, $30^1$ and $32^1$, 52 and 54, 56 and 58, and 64 and 66. Each of these pairs of rollers have lower shafts 182 and upper shafts 192 respectively, bearings 184, 186, for shafts 182, and bearings 194, 196 for shafts 192, and mating spur gears 216, 218. As may be best seen in FIG. 3 the final clinching rollers 64, 66, although having similar drive mechanisms and mounting means are not oriented in a vertical configuration as are all the other pairs of rollers. An angular support bracket 219 is rigidly secured to the base 102 and extends at an angle thereto immediately to the left of the mounting means for rollers 60 and 62. The bearing supports 188 and 190 for the rollers 64, 66 are mounted thereon, as are the supports 200 and 202. With this exception the mounting means for rollers 64 and 66 are identical to the mounting means for the other pairs of rollers in the machine 100.

Reference will now be made to FIGS. 2, 3, and 4 for a description of the drive means for the respective pairs of rollers incorporated in the buckle stock forming machine 100. An electric motor 220, controlled by a manually operated switch (not shown), is secured to the lower side of the base 102 and has a drive pulley 222 mounted on its output shaft 221. Belt 224 is connected from the pulley 222 to a large diameter drive pulley 226 having an integral spur gear 228 and mounted for rotation on shaft 230 which is in turn secured to the base 102 at the rear of the mounting means for rollers $30^1$ and $32^1$. Enmeshed with the spur gear 228 on the drive pulley 226 is a spur gear of greater diameter 232 on a rearward extension of shaft 182 of the roller 32. Thus a speed reduction is achieved from the motor 220 through the pulley 222, the belt 224, the drive wheel 226, the spur gear 228, the mating spur gear 232, to the shaft 182 connected to the roller 32. As best seen in FIG. 4, positive driving connections are made between the lower shafts 182 of the pairs of rollers in the machine 100, with the exception of rollers 64, 66, the drive means of which will be described below. A double sprocket 233 is rigidly secured between the spur gear 216 and the forward bearing 186 on the shaft 182 of the roller $32^1$. Connection is made to the rollers 30, 32 by means of a link chain 234 and the sprocket 236 mounted on shaft 182 of the roller 32. Sprocket 136 is of the same diameter as that portion of sprocket 233 over which link chain 234 is engaged; thus roller $32^1$ turns at the same rate as roller 32. Link chain 238 is connected to the other portion of double sprocket 233 and is linked over a similar double sprocket 240 mounted on the shaft 182 of roller 54. Link chain 242 is connected in turn from sprocket 240 to a double sprocket 244 rigidly mounted on the shaft 182 of roller 58. Link chain 246 is connected to sprocket 244 and then to sprocket 248 which is rigidly connected to the shaft 182 of roller 62. It will thus be appreciated that rollers 32, $32^1$, 54, 58 and 62 turn at the same rate of speed and in the same direction and, through the respective pairs of spur gears 216, 218 on the respective rotating shafts 182 and 192, the rollers 30, $30^1$, 52, 56 and 60 turn at an equal rate and in the opposite direction. Drive means for the final clinching rollers 64, 66 are provided through a rearward extension 250 of the shaft 192 of roller 60, extension 250 extending rearwardly of the gear bearing 194 and having rigidly attached thereto a bevelled gear 252. Bevelled gear 252 is connected to a mating bevel gear 254 rigidly secured to a vertical rotating shaft 256 mounted in bearings 258, 260 which are supported on brackets 262, 264 suitably secured to the base 102. At the upper end of shaft 256 is rigidly mounted a groove belt pulley 266 which transmits rotational power to the roller 66 through belt 268. The shaft 182 of roller 66 has a rearward extension 270 which extends rearward of the bearing 196 and on which is rigidly secured a grooved pulley 272 of the same size and configuration as pulley 266. The belt 268 is trained over pulleys 266 and 272 and is effective to transmit power between the shafts 256 and 182 on roller 66, even though said shafts are askew in relation to each other. Since the gearings and pulley arrangements as described above are all in a one-to-one relationship with each other, the rate of drive of roller 66, and therefore of roller 64, is equal to the rotational speed of the other pairs of rollers as described above. Therefore, as material flows along the path of manufacture it encounters a series of paired coacting rollers driven at the same speed which grasp the material therebetween and advance it along its path of travel.

A description will now be given of the laminating and trimming station 40, with reference being made to FIGS. 1 and 6. The function of the laminating and trimming station 40 is to join the continuous lining strip 44 with the facing material 42, thus producing the facing strip 38 which is assembled with the core strip 10 in the assembly station 36 as has been heretofore described. The laminating and trimming station 40, which is located below and forwardly of the preforming station 14 and the drive roller assembly 28, consists generally of an adhesive applying mechanism 274, joining rollers 276, 278 and trimming rollers 280, 282 comprising the trimming device 46.

The joining rollers 276, 278, and the trimming rollers 280, 282 are mounted on an auxiliary base 284 located below the main base 102 and supported on the pair of legs 104a and on an auxiliary pair of legs 286. The mounting means for joining rollers 276, 278 and the trimming rollers 280, 282 are similar to the mounting means described above for the drive roller assembly 28 and the shaping roller means 50. The lower rollers of each pair, specifically joining roller 278 and trimming roller 282, are rigidly supported upon the auxiliary base 284 by means of horizontally oriented rotating shafts 182 mounted for rotation in bearings 184 to the rear and 186 to the front (see FIG. 3). The bearings 184, 186 are supported in turn by bearing supports 188, 190 which are rigidly secured to the auxiliary base 284. The upper rollers of each pair, joining roller 276 and trimming roller 280, are mounted on shafts 192 which are supported in bearings 194 to the rear and 196 to the front, the rear bearing being rigidly connected to the auxiliary base 284 and the front bearing 196 being slidably supported on bearing support rods 204 and biased in a downward direction by springs 212 and adjustment nuts 208. Mating spur gears 216, 218 mounted on shafts 182, 192 respectively are effective to link the rotational movement of the rollers in each pair. The pairs of rollers themselves are linked by link chains 288 attached to suitable driving sprockets on the lower shafts 182. It will thus be appreciated that the mounting mechanism for the joining rollers 276, 278 and the trimming rollers 280, 282 are identical to the mounting mechanism for the shaping rollers 50 and the drive rollers 28 described in detail above. The drive mechanism for the laminating and trimming station 40 however, is not linked to the main drive assembly of the buckle stock forming machine 100. An auxiliary motor 290 and speed reduction 292 having an output shaft and pulley 294 is secured below the auxiliary base 284 and attached to the pair of legs 104a by mounting plate 296. A drive belt 298 connects the output shaft and pulley 294 of the speed reduction gearing 292 to the lower shaft 182 of joining roller 278 at suitable pulley means and is therefore effective to drive the joining rollers 276, 278 and the trimming rollers 280, 282. The power supply to the secondary motor 290 is controlled independently of the power supply to the main motor 220 in a manner to be more fully detailed below.

The adhesive applying mechanism 274 is positioned above the upper joining roller 276, secured to the underside of the base 102 by bracket 300. The continuous lining strip 44 enters the adhesive applying mechanism 274 from a supply (not shown) located above the machine 100. The adhesive applying mechanism, of a standard well known design, is effective to apply adhesive to one face of the lining strip 44. After adhesive has been applied to one face of the lining strip 44 the other face than contacts the upper joining roller 276 to be joined with the facing material 42. A delivery hose 302 is attached to the adhesive applying mechanism 274 and is effective to deliver a supply of adhesive material thereto from an external source (not shown).

A work table 304, supported on the legs 104a by bracket 306, is positioned at the height of the contact point between joining rollers 276, 278 and extends immediately to the right thereof as viewed in FIG. 1. An operator holds a piece of material facing 42, with its face against the top of the work table 304, and feeds the facing material 42 into the joining rollers 276, 278 to be adhesively joined with the lining strip 44 by the rolling pressure exerted by rollers 276 and 278.

After the backing strip 44 and the material facing 42 have been joined together they pass to the trimming device 46 which consists of the trimming rollers 280, 282 which are best seen in the sectional view of FIG. 6. The lower roller 282 is of rectangular cross section and acts to support the combined facing material 42 and backing strip 44 as it passes through the trimming device 46. The upper roller 280 has a pair of circumferentially extending knife edges 308 at its edges with a flat annular groove 310 located therebetween. The knife edges 308 are effective, upon rotation of the rollers 380, 282, to trim the edges of the facing strip 38 removing the excess facing material 42a, thus producing a unitary, parallel-sided facing strip 38. Upon leaving the laminating and trimming station 40 the facing strip 38 passes to a control mechanism 312 to be described in detail below. A curved guide bracket 314 secured to the underside of the base 102 is then effective to guide the facing strip 38 through the facing strip passage 128 in the base 102 on its way to the assembly station 36.

The drive mechanism for the facing and laminating station 40 are controlled independently of the drive for the rest of the buckle forming machine 100. The gearing in the speed reduction unit 292 is such that the joining rollers 276, 278 and the trimming rollers 280 and 282 rotate at a rate of speed which is faster than the rotation of the rollers in the drive roller assembly 28 and the shaping rollers 50. This allows a variable-length loop 316 or facing strip 38 to be produced between the trimming rollers 46 and the assembly station 36. While the travel of the core stock 10 is continuous the manufacturing process at the laminating and trimming station 40 is periodically interrupted, thus allowing the operator to place new pieces of facing material 42 on the work table 304 and then into the joining rollers 276, 278. The control means governing the operations of the trimming and laminating station 40, control means 312, are effective to measure the amount of facing strip 38 stored in the loop 316 and to turn on the motor 290 when the loop 316 is relatively long. The control means 312 consists of a pivotally mounted control rod 318 having a weighted roller 320 supported in the loop 316 as is best seen in FIG. 1. The other end of the control rod 318 is connected at pivot 322 to the mounting block 324 located on the supporting leg 104b. A toggle switch 325 having a toggle 326 is secured to the underside of the base 102 on plate 325a and is effective to control the electrical power to the motor 290 which drives the trimming and laminating station 40. Toggle switch 325 is of the hold contact type which maintains either an on or off position until its toggle 326 is moved. A link bar 328 extends downwardly from the toggle 326 and through an annular contact block 330 carried on the control rod 318. Two adjustable stops 332 and 334 are located on either side of the contact block 330 and are securely attached to the link bar 328. As the control rod 318 is pivoted about its pivotal mount 322 the contact block 330 moves relative to the link bar 328 and the adjustable stops 332, 334. When the loop 316 reaches a preset minimal limit the control rod 318 rotates in a counterclockwise direction as seen in FIG. 1 to the upper position indicated by the dotted lines. The contact block 330 then hits the upper stop 334 thus carrying the link bar 328 in an upward direction and therefore moving the toggle 326 of the toggle switch 325. As the toggle 326 is moved upwardly the switch 325 is placed in its "on" position and the motor 290 is energized, thus delivering rotational power to the trimming and laminating station 40. As the loop 316 of facing strip 38 increases in length the control bar 318 pivots in a clockwise direction as the weighted roller 320 moves downwardly. When the control rod 318 reaches its lowermost position, indicated by lowermost dotted lines in FIG. 1, the contact block 330 hits the lower adjustable stop 332, drawing the link bar 328 down, which is therefore effective, through the toggle 326, to place the toggle switch 325 in its "off" position. As the facing strip 38 is assembled with the core strip 10 in the assembly station 36 the supply of facing strip 38 in the loop 316 will be diminished, thus drawing the control bar 318 in an upwardly direction and the cyle of operations of the control device 312 is repeated as described.

Referring now to FIGS 2 and 4, description will be made of the control device which governs the operation of the cut-off means 138. Located on a rearward extension of upper shaft 192 of roller 30[1] is a timing pulley 336 which is connected through belt 338 to the timing wheel 340. The timing wheel 340 is mounted for rotation on a shaft 342 which is secured to the rear bearing support 198 located rearwardly of forming roller 60. Projecting transversely to the radius of the timing wheel 340 is a stud 344 which makes contact with the contact arm 346 of the micro switch 180 once for each rotation of the timing wheel 340. The normally opened microswitch 180 is connected in the power line to the cutting device solenoid 164, as has been heretofore described and as seen in FIG. 3. It will thus be appreciated that the cut-off mechanism 138 operates once for each revolution of the timing wheel 340. It should be noted that the length of buckle stock 12 which is produced as a result of the cut-off operations of the cut-off mechanism 138 may be controlled by a variation in the speed of the timing wheel 140. This is easily accomplished by varying the diameters of the timing pulley 336 and the timing wheel 340. Thus, it is possible to produce lengths of buckle stock 12 of any desired length.

A latitude of modification, substitution and change is intended in the foregoing disclosure and in some instances some features of the invention will be used without a use of other corresponding features. Acccordingly, the claims herein should be construed broadly and in a manner consistent with the spirit and scope of the invention.

What I claim is:

1. Buckle-forming stock comprising an elongated core strip including a main core section and a clinching section extending along one side edge thereof, said clinching section being of a width less than one half the width of said main core section, and an elongated facing strip of a width in excess of said core strip and including a main facing section medially of said facing strip and confronting one face of said main core section and auxiliary facing sections along opposite sides of said main facing section, one of said auxiliary facing sections being wrapped about said clinching section and folded back to extend over the opposite face of said core strip, the other of said auxiliary facing sections being folded back to extend over said opposite face of said core strip, said clinching section being folded back against said auxiliary facing section which extends over said main core section and said auxiliary facing sections extending between said folded back clinching section and said main core section to clinch said facing strip about said core strip, the assembly of said core and facing strip being longitudinally folded in half, with said clinching section inside the main core section, to form said buckle-forming stock and with said main facing section providing the opposite surfaces thereof.

2. Buckle-forming stock comprising an elongated core strip including a main core section and a clinching section extending along one side edge thereof, said clinching section being of a width less than one half the width of said main core section, and an elongated facing strip of a width in excess of said core strip and including a main facing section medially of said facing strip and confronting one face of said main core section and auxiliary facing sections along opposite sides of said main facing section, one of said auxiliary facing sections being wrapped about said clinching section and folded back to extend over the opposite face of said core strip, the other of said auxiliary facing sections being folded back to extend over said opposite face of said core strip, said clinching section being folded back against said auxiliary facing section which extends over said main core section and said auxiliary facing sections extending between said folded back clinching section and said main core section to clinch said facing strip about said core strip, the assembly of said core and facing strip being longitudinally folded in half, with said clinching section inside thereof, to form said buckle-forming stock, with said main facing section providing the opposite surfaces thereof.

3. A buckle body formed from a length of buckle-forming stock comprising an elongated core strip including a main core section and a clinching section extending along one side edge thereof, and an elongated facing strip of a width in excess of said core strip and including a main facing section medially of said facing strip and confronting one face of said main core section and auxiliary facing sections along opposite sides of said main facing section, one of said auxiliary facing sections being wrapped about said clinching section and folded back to extend over the opposite face of said core strip, the other of said auxiliary facing sections being folded back to extend over said opposite face of said core strip, said clinching section being folded back against said opposite face of said main core section and said auxiliary facing sections extending between said folded back clinching section and said main core section to clinch said facing strip about said core strip to form said length of buckle-forming stock, said length of buckle-forming stock being bent into the polygonal form to form said buckle body.

4. A buckle body formed from a length of buckle-forming stock comprising an elongated core strip including a main core section and a clinching section extending along one side edge thereof, and an elongated facing strip of a width in excess of said core strip and including a main facing section medially of said facing strip and confronting one face of said main core section and auxiliary facing sections along opposite sides of said main facing section, one of said auxiliary facing sections being wrapped about said clinching section and folded back to extend over the opposite face of said core strip, the other of said auxiliary facing sections being folded back to extend over said opposite face of said core strip, said clinching section being folded back against said opposite face of said main core section and said auxiliary facing sections extending between said folded back clinching section and said main core section to clinch said facing strip about said core strip, the assembly of said core and facing strip being longitudinally folded in half, with said clinching section inside thereof to form said length of buckle-forming stock and with said main facing section providing the opposite surfaces thereof, said length of buckle-forming stock being bent into the polygonal form to form said buckle body.

References Cited by the Examiner

UNITED STATES PATENTS

| | | | |
|---|---|---|---|
| 1,353,885 | 9/1920 | Aufderheide | 52—717 |
| 1,703,618 | 2/1929 | Groehn | 29—243.5 |
| 1,760,046 | 5/1930 | Dixon | 29—243.5 |
| 1,872,232 | 8/1932 | Borchert | 24—243 |
| 2,087,201 | 7/1937 | Cox | 24—163 |
| 2,153,484 | 4/1939 | Schemmel. | |
| 2,219,938 | 10/1940 | Reiter | 24—77 |
| 2,326,828 | 8/1943 | Camp | 29—180 |
| 2,326,833 | 8/1943 | Camp | 29—180 |
| 2,825,384 | 3/1958 | Goldsmith | 29—505 |
| 2,874,361 | 2/1959 | Brown | 336—209 |
| 3,111,156 | 11/1963 | Winberg | 29—505 |

FOREIGN PATENTS

| | | |
|---|---|---|
| 1,223,870 | 2/1960 | France. |
| 655,110 | 7/1951 | Great Britain. |

WILLIAM FELDMAN, *Primary Examiner.*

E. SIMONSEN, *Assistant Examiner.*